THERMOELECTRIC DETECTOR USING A SERIES-CONNECTED THERMOPILE

Filed Aug. 28, 1963

INVENTOR
M. V. SCHNEIDER
BY
Sylvan Sherman
ATTORNEY

United States Patent Office 3,421,081
Patented Jan. 7, 1969

3,421,081
THERMOELECTRIC DETECTOR USING A SERIES-CONNECTED THERMOPILE

Martin V. Schneider, Middletown, N.J., assignor to Bell Telephone Laboratories, Incorporated, New York, N.Y., a corporation of New York Filed Aug. 28, 1963, Ser. No. 305,071
U.S. Cl. 324—95 12 Claims
Int. Cl. G01r *23/04*; G01r *25/02*

ABSTRACT OF THE DISCLOSURE

The use of a thermopile as a sensitive high frequency power detector is described. By connecting the *n* thermocouples of the thermopile in series with respect to both the high frequency wavepath and the thermoelectric voltages that are generated, an *n*-fold increase in the detector signal-to-noise ratio is realized. Alternate hot and cold junctions are obtained by shaping the materials used to generate the thermoelectric voltages.

This invention relates to electromagnetic wave transmission systems and, in particular, to thermoelectric detectors for use in such systems.

Calorimetric techniques are widely used for the detection and measurement of radiant energy. A general feature of such calorimetric, or thermal detectors, is the partial or complete dissipation of the radiant energy in a lossy medium. The resulting temperature change produced in the medium is used as a direct or as an indirect indicator of the amount of energy absorbed.

Various thermoelectric transducers, such as barretters and thermistors, have been used for converting thermal energy into a measurable electrical quantity.

Passive devices of the types noted, however, have the disadvantage that they require a D.C. biasing source as well as a balancing arrangement, usually a Wheatstone bridge, in order to obtain a meaningful electric output signal. Additional circuitry is necessary in self-balancing arrangements.

In a recent article entitled, "The Properties of Thermo-Electric Elements as Microwave Power Detectors," by S. Hopfer, N. H. Riederman and L. A. Nadler, published in the Record of the 1962 I.R.E. National Convention, it is shown that the use of thermocouples in the microwave range is not only feasible but offers many advantages over passive calorimetric systems.

In the above-mentioned article, a thermoelectric junction or thermocouple, is used as a high frequency power detector. It is stated, however, that the use of a plurality of thermocouples in a thermopile arrangement would not increase the signal-to-noise ratio under optimum conditions. Such a restriction would materially limit the sensitivity and, hence, the utility of this type of energy detector.

It is, accordingly, an object of this invention to increase the sensitivity of thermoelectric power detectors.

It is a more specific object of this invention to increase the signal-to-noise ratio of high frequency thermoelectric detectors by means of a series arrangement of thermocouples.

In accordance with the invention a thermopile, comprising a plurality of series-connected thermocouples, is used as a thermal detector in a high frequency transmission path. The thermocouples are connected so that they are in series with respect to both the high frequency signal and the thermoelectric voltages generated. Since the thermopile effectively terminates the transmission path, the total resistance of the thermopile is preferably made equal to the characteristic impedance of the transmission path. Under these conditions, the signal-to-noise ratio of the detector is ideally improved over that of a single thermocouple by a factor equal to the number of thermocouples in the pile.

In the specific embodiments described, the alternate hot and cold junctions are obtained by shaping the materials used to generate the thermoelectric voltage.

In general, one or both of the cross-sectional dimensions of the thermocouple at the hot junction is less than the corresponding cross-sectional dimension at the cold junction. In one embodiment of the invention the cold junctions are made wider than the hot junctions. This has the effect of reducing the $I^2R$ losses at the cold junction and at the same time increasing the convection and radiation losses. These latter losses are further increased by coating the junctions with a suitable black material and by the presence of small ventilating holes.

In a second illustrative embodiment of the invention the hot and cold junctions have the same width but the thickness of each of the metallic films comprising the individual thermocouples is tapered from substantially less than skin depth thickness at the hot junctions to greater than skin depth thickness at the cold junctions.

These and other objects and advantages, the nature of the present invention, and its various features, will appear more fully upon consideration of the various illustrative embodiments now to be described in detail in connection with the accompanying drawings, in which.

Figure 1:
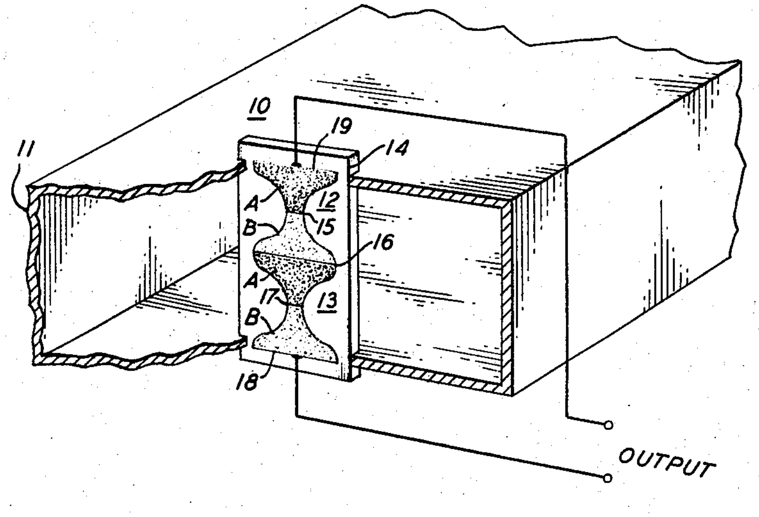
FIGURE 1 shows an illustrative embodiment of a thermal detector in accordance with the invention.

FIG. 1 shows a thermopile 10, in accordance with the invention, comprising a plurality of alternate hot and cold junctions transversely disposed across a high frequency wave transmission path 11, which, for purposes of illustration, is shown as a conductively bounded rectangular waveguide. For maximum sensitivity, the thermopile is advantageously located in a region of high electric field intensity in the path.

In the illustrative embodiment of FIG. 1, the thermopile 10 consists of two series-connected, tapered thermocouples 12 and 13. Each of the thermocouples 12 and 13 comprises a pair of thin film metallic elements of dissimilar metals A and B. Typical of the metal combinations commonly used in thermocouples are iron-constantan and bismuth-antimony. For a more detailed discussion of thermocouples (the so-called "Seebeck Effect") see "Handbook of Physics" McGraw-Hill Book Company, Inc., 1958, pp. 4–84 et seq.

The metallic films, which are of a thickness that is preferably less than skin depth thickness at the operating frequency, are deposited on a dielectric substrate 14 such as mica. The two dissimilar metals for generating a thermoelectric voltage are made partially overlapping in the junction regions 15, 16 and 17. The resulting structure comprises a plurality of alternate sections of two dissimilar metallic films, arranged in a linear array with adjacent ends of the dissimilar films in contact with each other to form a plurality of junctions.

The tapered shape of the metallic films produces the thermal differential between adjacent bimetallic junctions necessary for generating a thermoelectric voltage. This is accomplished as the result of two aiding effects. First, the $I^2R$ heating, due to the flow of high frequency current, is less at the wide junctions than at the narrow junctions. Accordingly, the ratio of the width of the cold junction to the width of the hot juncion is made as large as possible consistent with the power handling requirements of the detector. Typically, the cold junctions occupy from one-quarter to one-third of the guide width. The hot junctions, on the other hand, advantageously are made as narrow as is technically possible. With present techniques, a width of about one-tenth of a mil is feasible. A small width is desirable as it increases the sensitivity of the thermopile as well as reducing its thermal response time. Second, heat losses due to convection and radiation effects are greater at the wide junctions than at the narrow junctions. Thus, in the embodiment of FIG. 1, the wide junction 16 and the wide ends 18 and 19 are the cold junctions whereas the narrow junctions 15 and 17 are the hot junctions.

Figure 2:
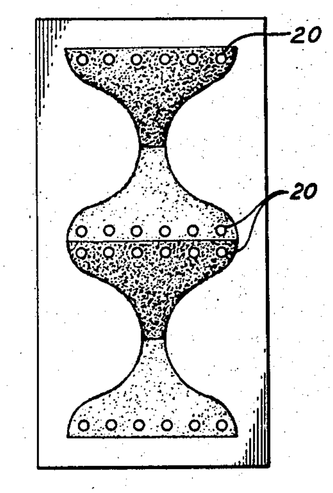
FIG. 2 shows a thermopile of the type used in FIG. 1 including cooling holes at the cold junctions.

Radiation cooling at the cold junctions is further enhanced by covering the wide junctions with a metallic or nonmetallic black. Convection cooling in the region of the cold junctions is enhanced by means of a large number of small ventilating holes 20, as shown in FIG. 2.

While an hour-glass shaped thermocouple is shown in FIG. 1, the exact shape of the taper is not a critical consideration. Other shaped tapers can be used as well to develop the required thermal differential. In addition, as will be explained in greater deail hereinbelow, the thickness of the metallic film can be tapered as well as its width.

In the above-mentioned article by Hopfer et al., it is shown that the signal-to-noise ratio for a thermocouple is proportional to $$E_1/\sqrt{R_1} \qquad (1)$$

where $E_1$ is the thermoelectric voltage generated by the thermocouple, and $R_1$ is the resistance of the thermocouple which is preferably equal to the characteristic impedance of the transmission line.

It is then proposed by Hopfer et al. to construct a thermopile of $n$ thermocouples which are series-connected with respect to thermoelectric voltage generated by each thermocouple but which are parallel-connected with respect to the transmission line. Since the $n$ parallel-connected thermocouples also terminate the line, the resistance R of each is given by $$R=nR_1 \qquad (2)$$

where $R_1$ is the characteristic impedance of the line.

Since there are now $n$ thermocouples, the total voltage generated is $$E_t=nE_1 \qquad (3)$$

At the same time, however, the Johnson noise voltage $V_n$ for the $n$ series-connected thermocouples is proportional to the square root of the series resistance $R_t$ of the thermopile. Thus $$V_n \propto \sqrt{R_t} \qquad (4)$$

Since $$R_t=nR \qquad (5)$$

we get from Equation 2 that $$V_n \propto \sqrt{n^2R_1} \qquad (6)$$

Neglecting all losses, the resulting signal-to-noise ratio SN is given by $$SN \propto \frac{nE_1}{\sqrt{n^2R_1}}=\frac{E_1}{\sqrt{R_1}} \qquad (7)$$

which is the same as that given by Equation 1 for a single thermocouple.

In accordance with the invention, this seeming limitation is avoided by arranging the thermocouples in R.F. series rather than R.F. parallel. In a series arrangement, the total series resistance of the thermopile remains equal to the characteristic impedance of the line, while the thermopile voltage increases by a factor proportional to the number of thermocouples. Thus, for the embodiment of FIG. 1, the signal-to-noise voltage, SN, neglecting losses, is given by $$SN \propto \frac{nE_1}{\sqrt{R_1}} \qquad (8)$$

This represents an $n$-fold improvement over a single thermocouple.

In practice, second-order effects tend to reduce the signal output so that it does not increase in proportion to the number of junctions. These second-order effects are due to increased thermal losses which tend to decrease the temperature differences between adjacent hot and cold junctions. This means that an optimum signal-to-noise ratio will be reached for a given finite number of junctions depending upon their geometrical configuration as well as the relative amounts of conduction, convection and radiation losses. Thus, whereas only two thermocouples are shown in the various illustrative embodiments, more than two can be used subject to the above-mentioned limitations.

Figure 3:
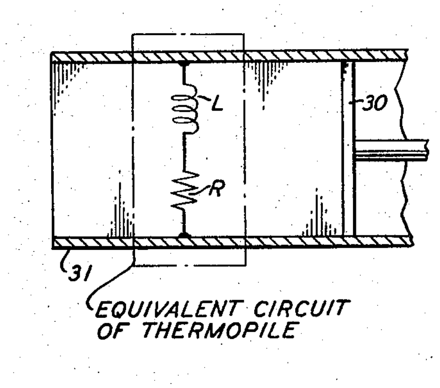
FIG. 3 is an equivalent circuit of the thermopile shown in FIG. 1.

The equivalent circuit of the series-connected thermopile described hereinabove is shown in FIG. 3. It comprises a series combination of a resistance R and an effective inductance L. The inductance L can be readily tuned out by means of a capacitive reactance. As is well known in the art, this reactance can be provided by means of an adjustable shorting piston 30, shown terminating the transmission line 31 in FIG. 3. Thus, the transmission line can be properly terminated at the operating frequency. To obtain a broadband termination the series inductance L is preferably made as small as possible. In FIGS. 4 to 7 various ways of reducing or resonating the effective inductance are shown.

Figure 4:
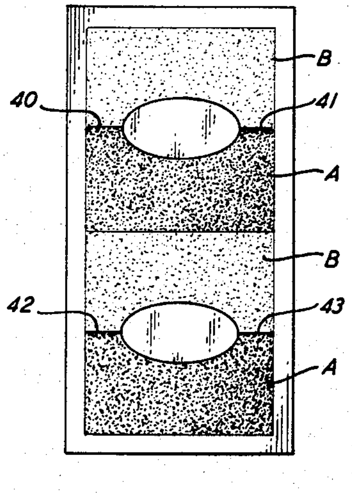
FIGS. 4, 5, 6 and 7 are alternate arrangements of the thermopile for use in accordance with the invention.

In FIG. 4 the hot junctions 40 and 41, 42 and 43 are made in pairs by removing the center portion of alternate junctions, thereby providing two adjacent high frequency current paths at each of these junctions. In such an arrangement the series inductance is reduced by more than a factor of two because of the mutual interaction between the two parallel flowing currents. In fact, as the current densities at the edges of the film are much higher than at the center, the inductance of the embodiment of FIG. 4 is not much greater than that of a full width film since only second-order effects are observed when the center portion is removed. It is obvious, however, that this balancing method reduces the output voltage by a factor of two.

Figure 5:
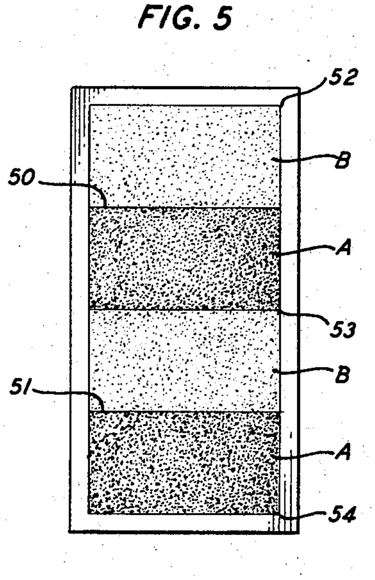
Figure 6:
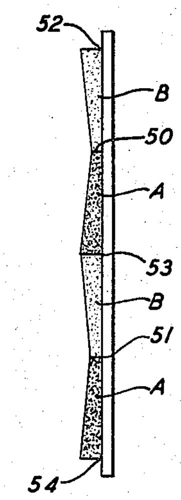

In the thermopile shown in FIGS. 5 and 6, the effective inductance of the thermopile is reduced to a minimum by extending the hot junctions 50 and 51 the full width of the thermopile. Thus, as shown in FIG. 5, the hot junctions 50 and 51 and cold junctions 52, 53 and 54 are of equal width. In this embodiment of the invention, the necessary temperature differential is produced by tapering the thickness of the metallic films A and B from substantially less than skin depth thickness at the hot junctions 50 and 51 to greater than skin depth thickness at the cold junctions 52, 53 and 54 as shown in the side view in FIG. 6. So tapered, junctions 50 and 51 appear as high resistances to the high frequency current flowing through the thermopile whereas junctions 52, 53 and 54 appear as low resistances to the current.

In addition to being low inductance, the arrangement shown in FIGS. 5 and 6 has substantially greater current handling capability and, hence, is to be preferred in high power circuits.

Figure 7:
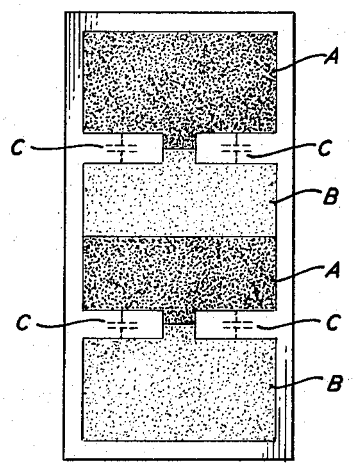

FIG. 7 is illustrative of a means for self-tuning the thermopile. In this embodiment the geometrical configuration of the thermopile is such that the stray capacitances, C, between adjacent cold junctions partially or totally resonate with the effective inductance of the thermocouples.

Thus, it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention. In particular, a combination of two or more of the techniques illustrated by separate embodiments can be used in a single embodiment.

What is claimed is:

1. A thermopile for use as a power detector of high frequency wave energy in a high frequency transmission path comprising:

a plurality of thermocouples disposed across said path at a common location;

said thermocouples being series-connected with respect to both the high frequency wave energy and the thermoelectric voltages generated by said thermocouples;

said thermopile having a total resistance substantially equal to the characteristic impedance of said path;

and means connected across said thermopile for utilizing said thermoelectric voltage generated.

2. A high frequency thermoelectric detector comprising:

a plurality of $n$ series-connected thermocouples connected, at a common location, in shunt with a section of transmission line having a characteristic impedance $Z_0$;

each of said thermocouples having an effective resistance equal to $Z_0/n$;

and output means connected across said thermocouples.

3. The combination according to claim 2 wherein each of said thermocouples comprises a pair of tapered metallic films whose cross-sectional dimensions are a minimum at their junction.

4. The combination according to claim 3 wherein said films have a thickness of less than skin depth and wherein the width of said films is tapered.

5. The combination according to claim 3 wherein said films have a uniform width and wherein their thickness tapers from greater than skin depth to less than skin depth.

6. A high frequency thermoelectric detector including:

a thermopile extending transversely across a transmission line having a characteristic impedance $Z_0$;

said thermopile comprising a plurality of alternate sections of two dissimilar metallic films arranged in a linear array with adjacent ends of said dissimilar films in contact with each other to form a plurality of hot and cold junctions;

said array having a total effective resistance that is substantially equal to the characteristic impedance of said line;

and output means connected across said thermopile for utilizing the thermoelectric voltage generated by said thermopile.

7. The thermopile in accordance with claim 6 wherein the width of said films at said hot junctions is substantially less than the width of said films at the cold junctions.

8. The thermopile in accordance with claim 6 wherein the thickness of said films varies from greater than skin depth at the cold junctions to less than skin depth at the hot junctions.

9. The thermopile in accordance with claim 6 wherein said cold junctions are coated black.

10. The thermopile in accordance with claim 6 wherein said cold junctions are provided with a plurality of ventilating holes.

11. The detector according to claim 6 wherein said thermopile has an effective inductance associated therewith and wherein means are provided for tuning said inductance.

12. The thermopile in accordance with claim 6 wherein said films have a uniform over-all width and wherein the center portion of alternate junctions is absent to form a pair of reduced width junctions at said alternate junctions.

References Cited

UNITED STATES PATENTS

| | | | |
|---|---|---|---|
| 2,485,905 | 11/1949 | Miller | 324—106 X |
| 2,629,757 | 2/1953 | McKay | 136—225 X |
| 2,652,723 | 9/1953 | Hastings | 324—95 X |
| 3,147,436 | 9/1964 | Hopfer | 324—95 |

OTHER REFERENCES

Early, H. C.; "A Wide-Band Wattmeter for Wave Guide"; Proceedings of the Institute of Radio Engineers and Waves and Electrons; vol. 34; No. 10; October 1946; pp. 803 through 807; copy in 324–95.

RUDOLPH V. ROLINEC, *Primary Examiner.*

E. F. KARLSEN, *Assistant Examiner.*

U.S. Cl. X.R.

324—106; 329—161